Jan. 27, 1942. G. HUNT 2,271,261
GREASE GUN
Filed May 31, 1940
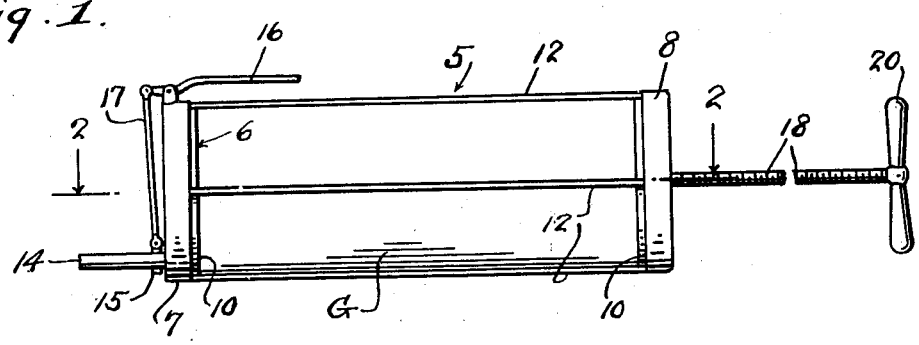
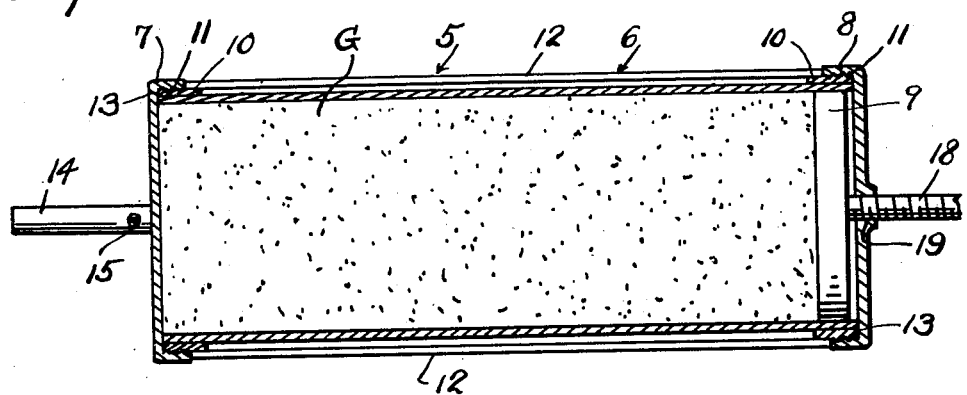
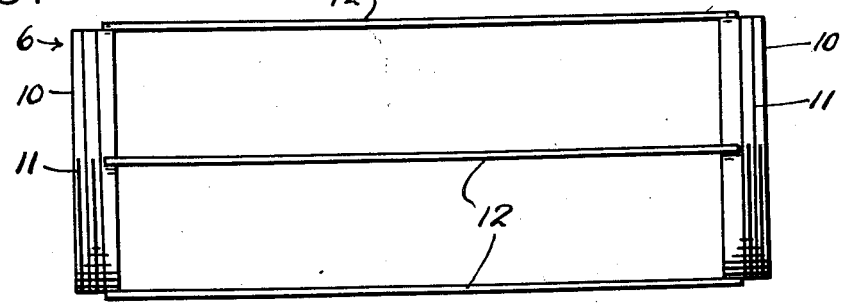
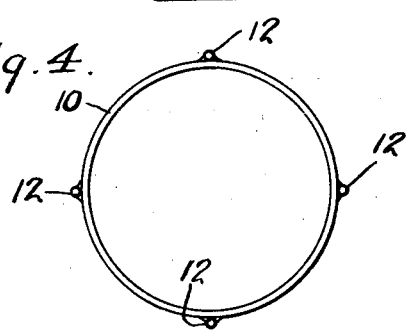
Inventor
Guss Hunt
By L. B. James
Attorney Patented Jan. 27, 1942

2,271,261

UNITED STATES PATENT OFFICE 2,271,261

GREASE GUN

Guss Hunt, Francisco, Ind.

Application May 31, 1940, Serial No. 338,255

1 Claim. (Cl. 221—47.3)

This invention relates to grease guns.

The primary object of this invention resides in the provision of a grease gun adapted to be filled with a cartridge of grease.

Another object of this invention resides in the particular construction of the grease cartridge retaining cage.

A further object of this invention resides in the manner of assembling the elements of the grease gun.

With these and other objects in view this invention resides in certain novel features of construction and arrangement of elements to be hereinafter more particularly set forth in the specification, illustrated in the accompanying drawing and pointed out in the appended claim and, while this disclosure depicts my present conception of the invention, the right is reserved to resort to such changes in construction and arrangement of the several parts as come within the scope of the claim.

In the accompanying drawing forming a part of this application;

Fig. 1 is a side view of a grease gun as constructed in accordance with this invention.

Fig. 2 is an enlarged longitudinal sectional view approximately on line 2—2 of Fig. 1.

Fig. 3 is an enlarged side view of the grease cartridge cage.

Fig. 4 is an end view of the cage.

In the present illustration of this invention the numeral 5 designates, in general, a grease gun consisting of a grease cartridge cage 6, front and rear heads 7 and 8 and a plunger 9.

The grease cartridge cage 6 consists of cylindrical bands 10 which are externally threaded as at 11 and connected together by a plurality of rods 12.

Each of the aforesaid 7 and 8 are internally threaded as at 13 for threadedly securing the same on the bands 10 of the grease cartridge cage, the front head 7 is provided with an outlet nozzle 14 having a valve 15 therein controlled by a suitable lever 16 and link connection 17.

The plunger 9 is provided with a stem 18 threadedly extending through a threaded aperture 19 in the head 8 and is provided with a handle 20 at its outer end to facilitate movement of the plunger against grease within a grease cartridge, herein indicated by the letter G.

In order to fill a grease gun of this character either of the heads may be unscrewed from the cage and a cartridge of grease inserted therein, of course it being understood the plunger is to be disposed in its retracted position. Subsequent to inserting the grease cartridge in the cage, the head so removed is replaced on the open end of the cage and pressure is placed against the grease by screwing the plunger inwardly and, when desiring grease to be discharged from the cartridge, it is simply necessary to operate the lever which controls the valve.

With this invention fully described it is manifest that a grease gun is provided which can be readily filled and speedily operated and, through the simplicity of the elements comprising the same, it can be cheaply manufactured and sold at a reasonable price.

Having thus described my invention what I claim and desire to protect by Letters Patent is:

A grease gun comprising spaced front and rear cylindrical bands having threads on their outer peripheries, circumferentially spaced rods connecting the bands with their ends secured to the outer peripheries thereof, a front head secured on one of the bands, an outlet nozzle secured to the front head, a suitable valve in the nozzle, a lever pivotally mounted on the front head, a link connecting the valve to the lever, a grease cartridge having both ends fully open disposed in the bands with one end bearing against the inner surface of the front head, a rear head secured on the other band with its inner surface bearing against the rear end of the cartridge, a plunger disposed in the cartridge, a threaded stem connected to the plunger and operable in a threaded aperture in the rear head and a handle on the free end of the stem.

GUSS HUNT.